UNITED STATES PATENT OFFICE.

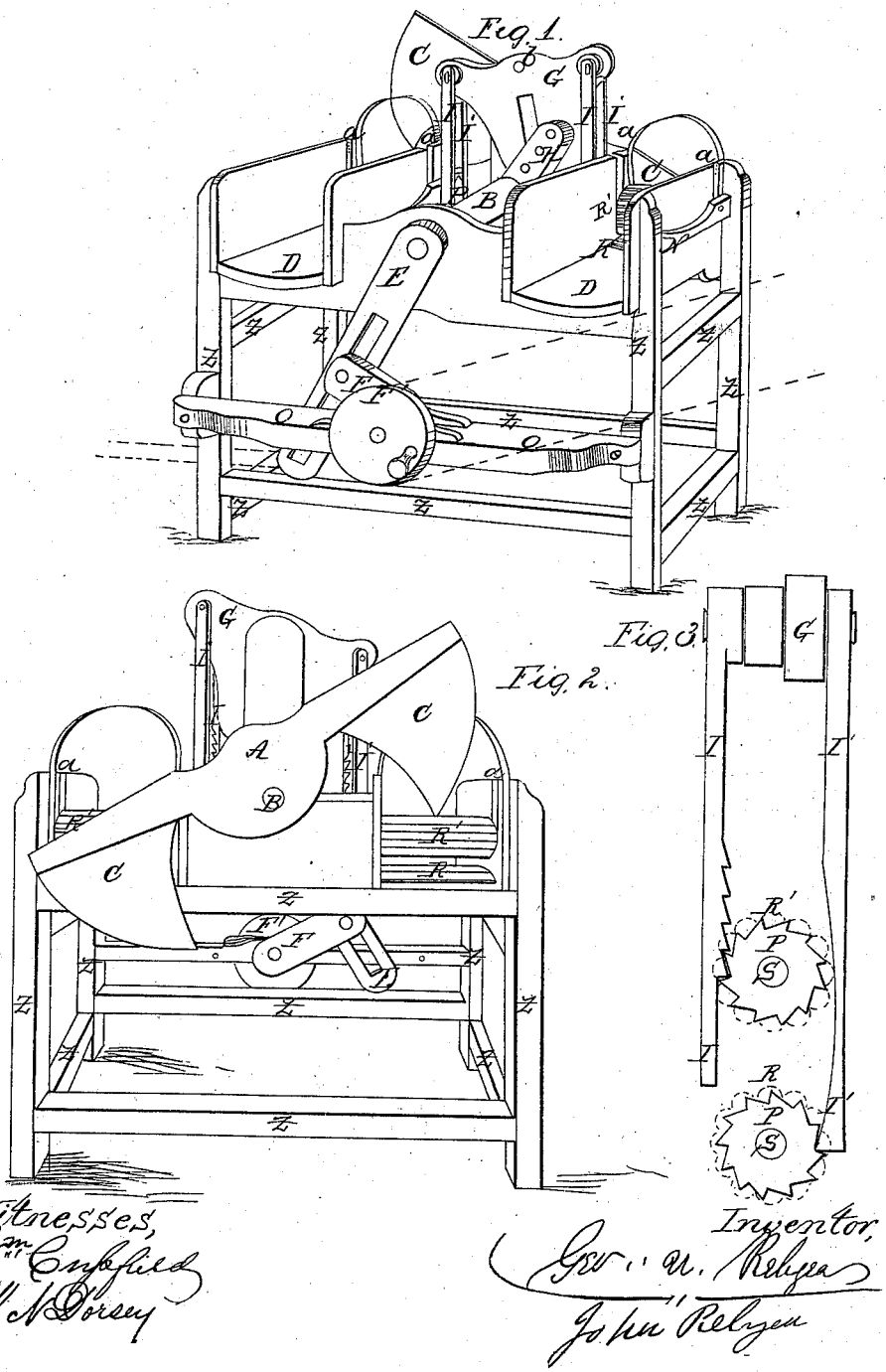

GEO. U. RELYEA, OF VETERAN, AND JOHN RELYEA, OF HORSEHEADS, NEW YORK.

STRAW-CUTTER.

Specification of Letters Patent No. 31,740, dated March 19, 1861.

*To all whom it may concern:*

Be it known that we, GEORGE U. RELYEA, of the town of Veteran, and JOHN RELYEA, of the town of Horseheads, both in the county of Chemung and State of New York, have invented a new and Improved Machine for Cutting Straw and Cornstalks, called a "Straw-Cutter;" and we do hereby declare that the following is a full and exact description thereof, reference being had to the accompanying drawings and to the letters of reference marked thereon.

Figure 1 is a rear perspective view of our straw cutter, showing the manner in which the power may be attached, and Fig. 2, is a front perspective view of the same, showing more especially the knives c, c, and the mode in which they operate. Fig. 3, an elevation on an enlarged scale of the device for operating the feed rollers.

The same part is marked by the same letter wherever it occurs.

On a substantial frame Z we place two straw boxes D, D, similar in form to those of ordinary straw cutters. They are fixed about eighteen inches apart, and near their front ends are placed the feed rollers R, R', the lower rollers R working through slots in the bottom of the boxes D and the shafts of the upper rollers R' playing in vertical slots a in the sides of the boxes. These upper rollers are pressed down upon the straw by the springs N which receive the ends of their shafts S, and render the feed yielding. On the inner ends of shafts S are placed ratchet tooth pinions P, which receive and engage with the teeth of racks I and pawls I' (see Fig. 3.) These racks and pawls are attached to the oscillating lever G, which vibrates on pivot b, and is moved by crank arm H, projecting from main shaft B, a small pin passing through said arm and projecting into a groove in the lever G. There are several holes in arm H for the pin, the position of which regulates the amount of motion imparted to lever G and consequently the amount of straw fed at each cut to the knives.

B marks the main shaft of the machine, which receives a vibratory motion from slotted arm E, driven by crank arm F, attached to pulley F', which may receive motion from any suitable power.

To the front end of shaft B is attached lever A, to the ends of which the peculiarly-shaped knives C are fastened. These knives have concave and convex edges, as shown in Fig. 2, and they work against the front ends of the straw boxes D, D.

The operation of the machine is as follows: Power being applied to pulley F', a vibratory motion is imparted to shaft B, which communicates a similar motion to lever A, and to the knives C, which alternately rise and fall across the front ends of their respective straw boxes. The vibration of this shaft also imparts a vibratory motion to lever G which carries the racks and pawls I, I', which operate the feed rollers R R' by means of ratchet pinions P. Thus at each vibration of the shaft the straw in the boxes is fed up and cut off in a rapid and efficient manner.

Having thus fully described the construction and operation of our improved straw cutter, what we claim and desire to secure by Letters Patent is—

1. The peculiarly shaped cutters C, C, pointed and cutting with both edges, arranged and operated substantially as set forth.

2. In combination with the lever G constructed and operated as described, the pawls and racks I, I', and pinions P, for operating the feed rollers, substantially in the manner set forth.

3. In combination with a straw cutting machine, constructed as described, the shaft B, arm H, lever G, and lever A, arranged for conjoint operation as specified.

GEO. U. RELYEA.
JOHN RELYEA.

In presence of—
ARCHIBALD ROBERTSON,
N. P. FASSETT.